(12) United States Patent
Xu

(10) Patent No.: US 10,254,597 B2
(45) Date of Patent: Apr. 9, 2019

(54) PIXEL ELECTRODE STRUCTURE AND LIQUID CRYSTAL DISPLAY PANEL

(71) Applicant: SHENZHEN CHINA STAR OPTOELECTRONICS TECHNOLOGY CO., LTD., Guangdong (CN)

(72) Inventor: Liang Xu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 254 days.

(21) Appl. No.: 15/123,162

(22) PCT Filed: Apr. 5, 2016

(86) PCT No.: PCT/CN2016/078437
§ 371 (c)(1),
(2) Date: Sep. 1, 2016

(87) PCT Pub. No.: WO2017/152448
PCT Pub. Date: Sep. 14, 2017

(65) Prior Publication Data
US 2018/0149931 A1    May 31, 2018

(30) Foreign Application Priority Data
Mar. 11, 2016  (CN) .......................... 2016 1 0139944

(51) Int. Cl.
G02F 1/137  (2006.01)
G02F 1/1337  (2006.01)
G02F 1/1343  (2006.01)

(52) U.S. Cl.
CPC ........ *G02F 1/134336* (2013.01); *G02F 1/137* (2013.01); *G02F 1/1343* (2013.01); *G02F 1/133707* (2013.01); *G02F 2001/13775* (2013.01); *G02F 2001/134345* (2013.01); *G02F 2201/122* (2013.01); *G02F 2201/123* (2013.01)

(58) Field of Classification Search
CPC ............... G02F 1/133707; G02F 2001/134345
See application file for complete search history.

(56) References Cited

U.S. PATENT DOCUMENTS

| 9,746,721 B2 | 8/2017 | Lai et al. |
| 9,927,908 B2 | 3/2018 | Li et al. |
| 2002/0163604 A1 | 11/2002 | Kim et al. |

(Continued)

FOREIGN PATENT DOCUMENTS

| CN | 101221332 A | 7/2008 |
| CN | 101369073 A | 2/2009 |

(Continued)

*Primary Examiner* — Jessica M Merlin
(74) *Attorney, Agent, or Firm* — WPAT, PC

(57) ABSTRACT

A pixel electrode structure and a liquid crystal display panel are provided. That includes: a strip shaped horizontal main trunk; a strip shaped vertical main trunk crossing the strip shaped horizontal main trunk; and a plurality of strip shaped branches diverging outward from a crossed center between the vertical main trunk and the horizontal main trunk. There is at least one slit in the horizontal main trunk and the vertical main trunk.

9 Claims, 7 Drawing Sheets

(56) References Cited

U.S. PATENT DOCUMENTS

2013/0329175 A1* 12/2013 Kuboki ............ G02F 1/133753
349/128
2015/0177569 A1    6/2015 Zhang
2017/0052396 A1    2/2017 Cheng et al.

FOREIGN PATENT DOCUMENTS

| CN | 101740581 A | * | 6/2010 |
| CN | 102854673 A | | 1/2013 |
| CN | 104461209 A | | 3/2015 |
| CN | 104880867 A | | 9/2015 |
| CN | 105182635 A | | 12/2015 |

* cited by examiner

PIXEL ELECTRODE STRUCTURE AND LIQUID CRYSTAL DISPLAY PANEL

BACKGROUND OF THE INVENTION

1. Field of the Invention

The present invention relates to a field of liquid crystal display technology, and more specifically to a pixel electrode structure and a liquid crystal display (LCD) panel.

2. Description of the Prior Art

An LCD is one of the most popular flat panel displays. The LCD includes: a pair of substrates having a field emission electrode (such as a pixel electrode and a common electrode) thereon; and a liquid crystal layer sandwiched between the substrates. An electric field is generated in the liquid crystal layer when a voltage is applied to the field emission electrode. The electric field decides the alignment of liquid crystal molecules in the liquid crystal layer, thus an image is displayed on the LCD when the polarization of incident lights penetrating the liquid crystal layer is adjusted.

At present, a technology called polymer stabilized vertical alignment (PSVA) has been developed in the industry. In the technology, a suitable concentration of monomer is mixed in a liquid crystal material, and then is uniformly shaken. Then, the mixed liquid crystal material is placed on a heater, and then is heated to an isotropic state. The liquid crystal mixture is returned to a nematic state when the liquid crystal mixture is cooled to room temperature. Then, the liquid crystal mixture is injected into a liquid crystal cell, and then a voltage is applied. When the liquid crystal molecules are stably arranged by applying a voltage, the monomer is polymerized by way of an ultraviolet light or heating to form a polymer layer, so as to achieve the object of a stable alignment.

FIG. 1 is a schematic view of a structure of a pixel electrode often used in a universal VA mode LCD.

The pixel electrode of the universal VA mode LCD of FIG. 1 is designed as a "✳" shape. The pixel electrode includes a strip shaped vertical main trunk, a strip shaped horizontal main trunk, and a plurality of strip shaped branches. There is a certain angle between the strip shaped branches and the horizontal main trunk, respectively. Generally, an angle between the strip shaped branches and the horizontal main trunk is ±45 degrees or ±13 degrees. Each of the strip shaped branches, the vertical main trunk, and the horizontal main trunk are located on the same plane. The center of the vertical main trunk and the center of the horizontal main trunk are vertically crossed. The vertical cross of the center means that the vertical main trunk is perpendicular to the horizontal main trunk. The area around the center of the vertical cross is the central area of the single pixel electrode. The whole pixel area is equally divided into four domains by the vertical main trunk and the horizontal main trunk. The strip shaped branches, which are at a certain angle to the vertical main trunk or the horizontal main trunk, are tiled in each of the four domains. Thus, the "✳" shaped electrode of FIG. 1 is formed. In the "✳" shaped electrode, the upper and lower parts thereof and the left and right parts thereof are mirror symmetrical, respectively.

FIG. 2 shows a schematic view of the tilt of liquid crystals after a voltage (about 0-4 V; arrows are used to represent an applied voltage) is applied to the pixel electrode of FIG. 1.

As shown in FIG. 2, the liquid crystals are gradually tilted from the outside of the pixel electrode to the inside of the pixel electrode when a "✳" shaped electrode structure which is widely used is energized. The angle of the tilt is along the direction of the branches. In the four domains, the liquid crystals of the upper-right domain thereof have a tilting direction of 45 degrees; the liquid crystals of the upper-left domain thereof have a tilting direction of 135 degrees; the liquid crystals of the lower-left domain thereof have a tilting direction of 225 degrees; the liquid crystals of the lower-right domain thereof have a tilting direction of 315 degrees. The liquid crystals of the upper-left domain and the upper-right domain are gradually tilted from the outside of the pixel electrode to the inside of the pixel electrode when a voltage is applied, since the symmetric strip shaped branches of the upper-left domain and the upper-right domain are diverged outward along the center of the vertical main trunk. The angle of the tilt is along the direction of the branches. At this point, the tilt of the liquid crystals between two intersecting lines of the symmetric strip shaped branches crossing the vertical main trunk is very easy to be in a chaotic state. Similarly, the tilt of the liquid crystals between two intersecting lines of the symmetric strip shaped branches of the upper-left domain and the lower-left domain crossing the horizontal main trunk is also very easy to be in a chaotic state, thus dark fringes are easily produced on the "+" shaped trunk of a "✳" shaped pixel electrode, so that the display effects of the "+" shaped trunk are poor.

SUMMARY OF THE INVENTION

The present invention provides a pixel electrode structure. The technical problem of dark fringes, which easily produced on the solid cross of a "✳" shaped pixel electrode structure by using the "✳" shaped pixel electrode structure in a PSVA mode LCD mode in the prior art, can be effectively solved.

To overcome the above-mentioned disadvantages, the pixel electrode structure provided by the present invention includes:

a strip shaped horizontal main trunk;

a strip shaped vertical main trunk crossing the strip shaped horizontal main trunk; and a plurality of strip shaped branches diverging outward from a crossed center between the vertical main trunk and the horizontal main trunk, wherein there is at least one slit in the horizontal main trunk and the vertical main trunk, and the horizontal main trunk and the vertical main trunk are vertically crossed.

According to one embodiment of the present invention, the slit located in the horizontal main trunk and the vertical main trunk is contiguous.

According to one embodiment of the present invention, the slit located in the horizontal main trunk and the vertical main trunk is discontinuous.

The extending direction of the slit located in the horizontal main trunk is the same as the extending direction of the horizontal main trunk. The extending direction of the slit located in the vertical main trunk is the same as the extending direction of the vertical main trunk.

Every two of the strip shaped branches are symmetrical with each other in relation to the vertical main trunk and the horizontal main trunk. The symmetric strip shaped branches and both horizontal edges of the horizontal main trunk (or both vertical edges of the vertical main trunk) have a intersecting line therebetween, respectively. The slit is located between the two intersecting lines.

The present invention further provides a pixel electrode structure which includes:

a strip shaped horizontal main trunk;

a strip shaped vertical main trunk crossing the strip shaped horizontal main trunk; and a plurality of strip shaped branches diverging outward from a crossed center between the vertical main trunk and the horizontal main trunk, wherein there is at least one slit in the horizontal main trunk and the vertical main trunk.

According to one embodiment of the present invention, the slit located in the horizontal main trunk and the vertical main trunk is contiguous.

According to one embodiment of the present invention, the slit located in the horizontal main trunk and the vertical main trunk is discontinuous.

The extending direction of the slit located in the horizontal main trunk is the same as the extending direction of the horizontal main trunk. The extending direction of the slit located in the vertical main trunk is the same as the extending direction of the vertical main trunk.

Every two of the strip shaped branches are symmetrical with each other in relation to the vertical main trunk and the horizontal main trunk. The symmetric strip shaped branches and both horizontal edges of the horizontal main trunk (or both vertical edges of the vertical main trunk) have a intersecting line therebetween, respectively. The slit is located between the two intersecting lines.

According to the above object of the present invention, an LCD panel is provided. The LCD panel includes:

a first substrate including a first electrode;

a second substrate comprising a second electrode and a plurality of pixel areas, the second electrode having a pixel electrode structure in each of the pixel areas, the pixel electrode structure comprising: a strip shaped horizontal main trunk; a strip shaped vertical main trunk crossing the strip shaped horizontal main trunk; and a plurality of strip shaped branches diverging outward from a crossed center between the vertical main trunk and the horizontal main trunk, wherein there is at least one slit in the horizontal main trunk and the vertical main trunk; and a liquid crystal layer formed between the first substrate and the second substrate.

The slit located in the horizontal main trunk and the vertical main trunk is contiguous.

The slit located in the horizontal main trunk and the vertical main trunk is discontinuous.

The extending direction of the slit located in the horizontal main trunk is the same as the extending direction of the horizontal main trunk. The extending direction of the slit located in the vertical main trunk is the same as the extending direction of the vertical main trunk.

Every two of the strip shaped branches are symmetrical with each other in relation to the vertical main trunk and the horizontal main trunk. The symmetric strip shaped branches and both horizontal edges of the horizontal main trunk (or both vertical edges of the vertical main trunk) have a intersecting line therebetween, respectively. The slit is located between the two intersecting lines.

In the pixel electrode structure and the LCD panel of the present invention, at least one slit is provided in the horizontal main trunk and the vertical main trunk, rather than the use of "*" shaped electrode structure as an existing PSVA mode LCD, in which the horizontal main trunk and the vertical main trunk thereof employ a solid structure, so as to reduce opaque areas. Liquid crystal molecules can obtain a better tilt since the at least one slit in the horizontal main trunk and the vertical main trunk separates strip shaped branches which are symmetrical with each other, thus extrusion is not easily produced. Therefore, the problem of dark fringes, which are easily produced on the solid cross of a pixel electrode, can be solved.

BRIEF DESCRIPTION OF THE DRAWINGS

To describe the technical solutions in the embodiments more clearly, the following briefly introduces the accompanying drawings required for describing the embodiments or the prior art. The accompanying drawings in the following description show merely some embodiments of the present invention, and persons of ordinary skill in the art may still derive other drawings from the accompanying drawings without creative efforts.

DETAILED DESCRIPTION OF THE PREFERRED EMBODIMENTS

Figure 1:
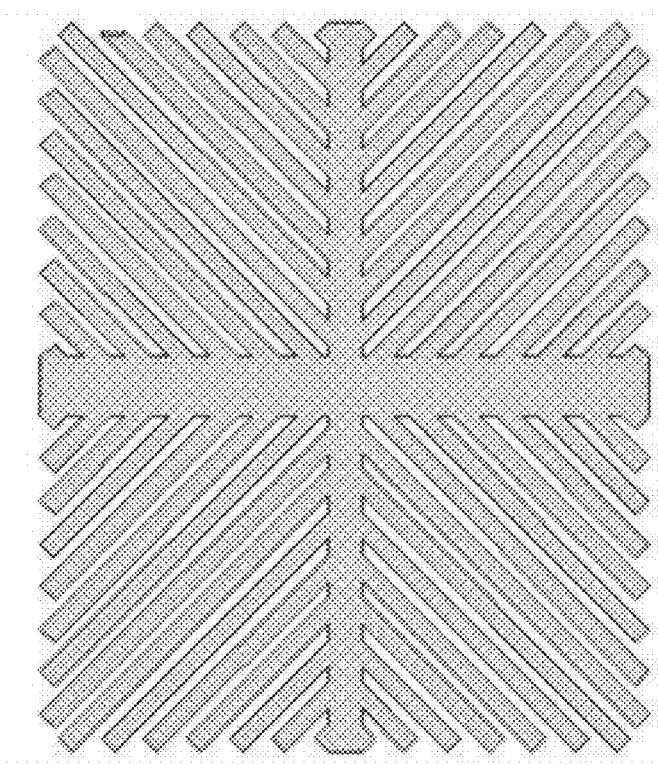
FIG. 1 is a schematic view of a structure of a pixel electrode often used in a universal VA mode LCD.
Figure 2:
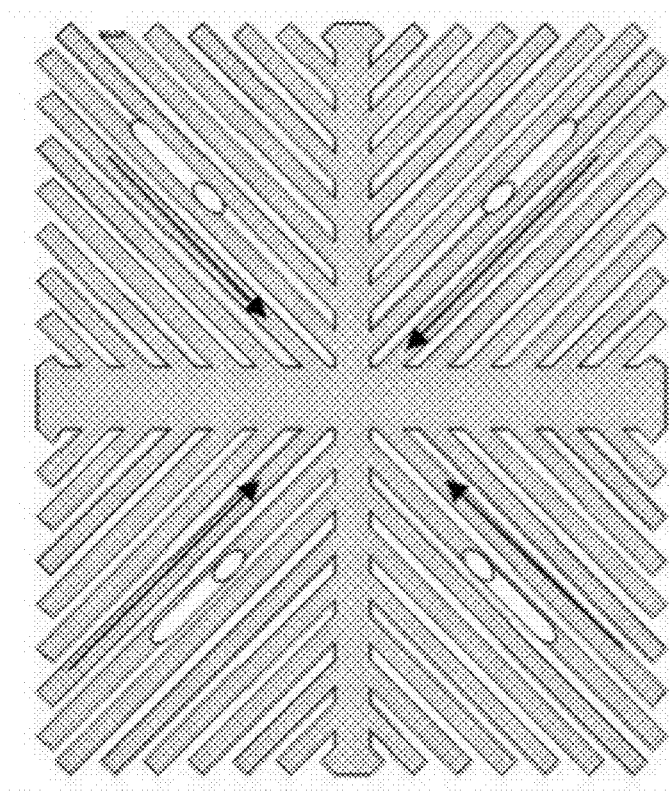
FIG. 2 shows a schematic view of the tilt of liquid crystals after a voltage is applied to the pixel electrode of FIG. 1.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", "left", "right", "inside", "outside", "side", etc., is used with reference to the orientation of the figure(s) being described. As such, the directional terminology is used for purposes of illustration and is in no way limiting. Throughout this specification and in the drawings like parts will be referred to by the same reference numerals.

For a defect of dark fringes that is easily produced on the cross of the middle of an existing pixel electrode structure, the present invention provides a novel pixel electrode structure which can effectively overcome the defect.

First of all, the present invention is based on the improvement to an existing "*" shaped pixel electrode structure. The key is that at least one slit is provided in the crossshaped support of the existing pixel electrode structure, so as to reduce opaque areas. Liquid crystal molecules can obtain a better tilt since the at least one slit in the horizontal main trunk and the vertical main trunk separates strip shaped branches which are symmetrical with each other, thus extrusion is not easily produced.

The implementation of the embodiment of the present invention will now be described with reference to annexed drawings.

Figure 3:
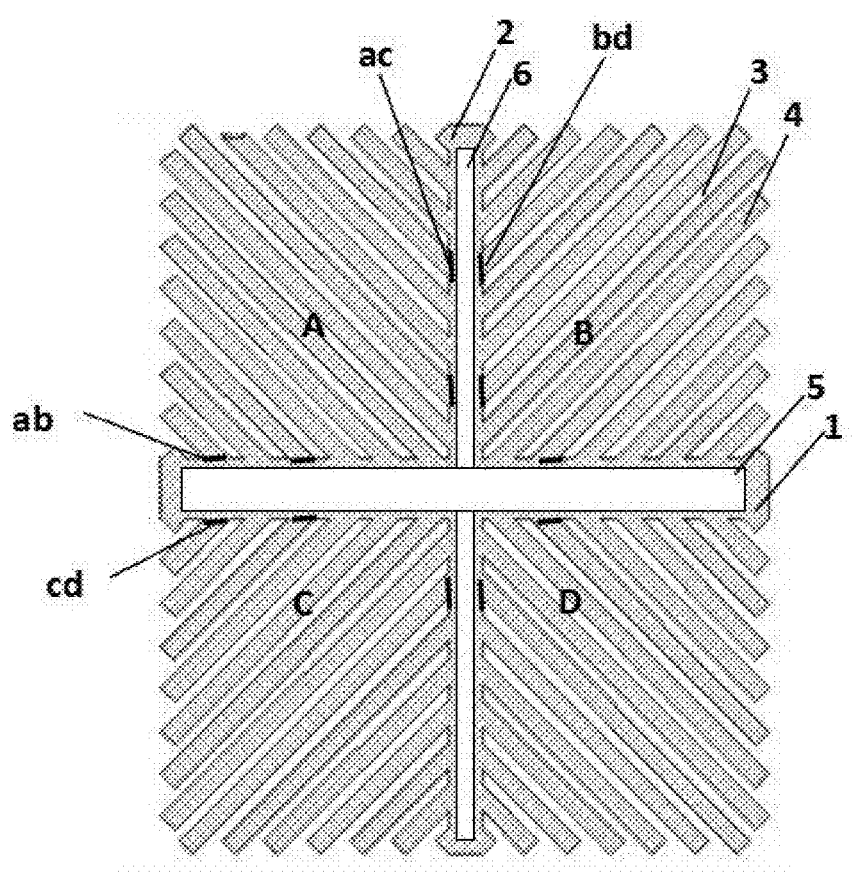
FIG. 3 is a schematic view of a structure of a pixel electrode structure according to a first embodiment of the present invention.

Please refer to FIG. 3, which is a schematic view of a structure of a pixel electrode structure according to a first embodiment of the present invention.

The pixel electrode structure of the embodiment includes: a strip shaped horizontal main trunk 1 and a strip shaped vertical main trunk 2, the horizontal main trunk 1 and the vertical main trunk 2 being vertically crossed.

There are a plurality of strip shaped branches 3, which are at a certain angle to the horizontal main trunk 1 and the vertical main trunk 2, in four domains (four domains A, B, C, and D of the figure) divided by the vertical crossing of the horizontal main trunk 1 and the vertical main trunk 2. Preferably, angles between the strip shaped branches 3 and the horizontal main trunk 1 (or the vertical main trunk 2) are 45 degrees. Of course, the angles can also be other angles. For example, angles between the strip shaped branches 3 and the horizontal main trunk 1 are 60 degrees in the domain B, and angles between the strip shaped branches 3 and the horizontal main trunk 1 are 120 degrees in the domain A, as long as the strip shaped branches 3 in the domain A and the strip shaped branches 3 in the domain B remain symmetrical, and the strip shaped branches 3 in the domain C and the strip shaped branches 3 in the domain D remain symmetrical. The domain A and the domain B are mirror symmetrical. The domain C and the domain D are mirror symmetrical. The domain A and the domain C are mirror symmetrical. The domain B and the domain D are mirror symmetrical. A plurality of strip shaped branches 4 are diverged outward from a crossed center between the vertical main trunk 2 and the horizontal main trunk 1. There is a gap 3 between the adjacent strip shaped branches 4.

The strip shaped branches in the domains A and B and the horizontal edge of the horizontal main trunk 1 are intersected to form a horizontal line ab which is discontinuous. The strip shaped branches in the domains C and D and the horizontal edge of the horizontal main trunk 1 are intersected to form a horizontal line cd which is discontinuous. The horizontal line ab and the horizontal line cd are respectively located at the two horizontal ends of the horizontal main trunk 1.

There is a slit 5 in the horizontal main trunk 1. The extending direction of the slit 5 is the same as the extending direction of the horizontal main trunk. The slit 5 is located between the horizontal line ab and the horizontal line cd.

The strip shaped branches in the domains A and C and the vertical edge of the vertical main trunk 2 are intersected to form a vertical line ac which is discontinuous. The strip shaped branches in the domains B and D and the vertical edge of the vertical main trunk 2 are intersected to form a vertical line bd which is discontinuous. The vertical line ac and the vertical line bd are respectively located at the two vertical ends of the vertical main trunk 2.

There is a slit 6 in the vertical main trunk 2. The extending direction of the slit 6 is the same as the extending direction of the vertical main trunk. The slit 6 is located between the vertical line ac and the vertical line bd.

Figure 8:
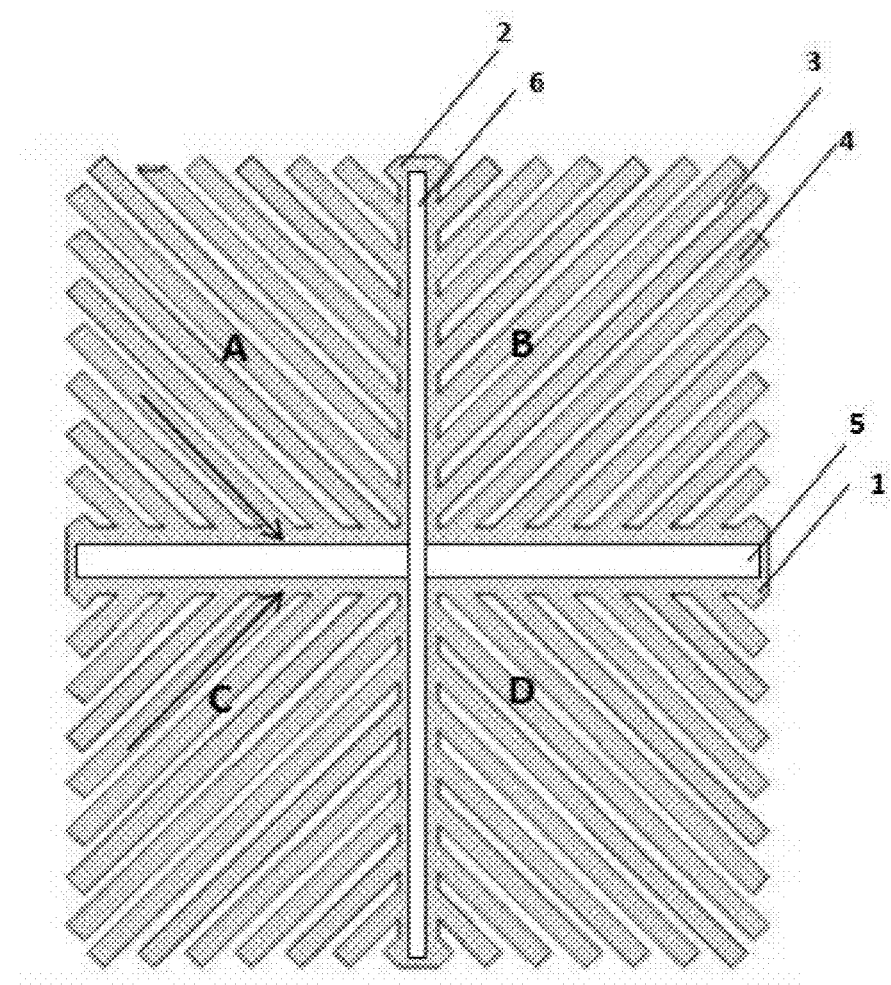
FIG. 8 is a schematic view of a structure of the tilt of liquid crystal molecules after a voltage is applied to the pixel electrode structure according to the first embodiment.

Please refer to FIG. 8, which is a schematic view of a structure of the tilt of liquid crystal molecules after a voltage is applied to the pixel electrode structure according to the first embodiment.

Liquid crystals are gradually tilted from the outside of the pixel electrode to the inside of the pixel electrode when a voltage is applied to the pixel electrode structure. The angle of the tilt is along the direction of the branches. The slit 5 and the slit 6 respectively separate every two of the strip shaped branches which are symmetrical with each other in relation to the vertical main trunk 2 and the horizontal main trunk 1 in the four domains, so that liquid crystals where the strip shaped branches and the horizontal main trunk (or the vertical main trunk) are intersected are tilted along the direction of the branches, rather than the mutual interference of the liquid crystals being tilted along two different directions containing the direction of the branches and a horizontal direction (or a vertical direction), thereby the liquid crystal molecules on the vertical main trunk and the horizontal main trunk are tilted in a particular direction, thus chaos cannot occur, and the dark fringes cannot be produced.

Figure 4:
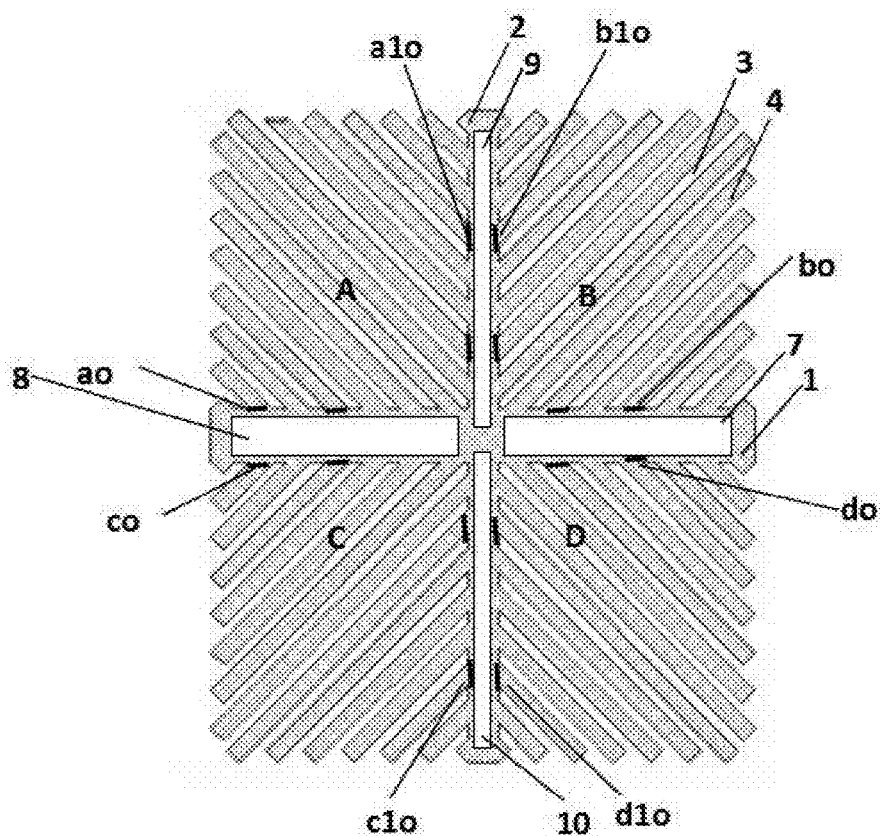
FIG. 4 is a schematic view of a structure of a pixel electrode structure according to a second embodiment of the present invention.

FIG. 4 is a schematic view of a structure of a pixel electrode structure according to a second embodiment of the present invention.

The pixel electrode structure of the embodiment includes: a strip shaped horizontal main trunk 1 and a strip shaped vertical main trunk 2, the horizontal main trunk 1 and the vertical main trunk 2 being vertically crossed.

There are a plurality of strip shaped branches 3, which are at a certain angle to the horizontal main trunk 1 and the vertical main trunk 2, in four domains (four domains A, B, C, and D of the figure) divided by the vertical crossing of the horizontal main trunk 1 and the vertical main trunk. Preferably, angles between the strip shaped branches 3 and the horizontal main trunk 1 (or the vertical main trunk 2) are 45 degrees. Of course, the angles can also be other angles. For example, angles between the strip shaped branches 3 and the horizontal main trunk 1 are 60 degrees in the domain B, and angles between the strip shaped branches 3 and the horizontal main trunk 1 are 120 degrees in the domain A, as long as the strip shaped branches 3 in the domain A and the strip shaped branches 3 in the domain B remain symmetrical, and the strip shaped branches 3 in the domain C and the strip shaped branches 3 in the domain D remain symmetrical. The domain A and the domain B are mirror symmetrical. The domain C and the domain D are mirror symmetrical. The domain A and the domain C are mirror symmetrical. The domain B and the domain D are mirror symmetrical. A plurality of strip shaped branches 4 are diverged outward from a crossed center between the vertical main trunk 2 and the horizontal main trunk 1. There is a gap 3 between the adjacent strip shaped branches 4.

The strip shaped branches in the domains A and C and the two horizontal ends of the horizontal main trunk 1 are intersected to form two horizontal lines ao and co which are discontinuous. The strip shaped branches in the domains B and D and the two horizontal ends of the horizontal main trunk 1 are intersected to form two horizontal lines bo and do which are discontinuous. The horizontal lines ao and bo and the horizontal lines co and do are respectively located at the two horizontal ends of the horizontal main trunk 1.

There are slits 7 and 8 in the horizontal main trunk 1. The extending direction of the slits 7 and 8 is the same as the extending direction of the horizontal main trunk 1. The slit 8 is located between the horizontal line ao and the horizontal line co. The slit 7 is located between the horizontal line bo and the horizontal line do.

The strip shaped branches in the domains A and B and the two vertical ends of the vertical main trunk 2 are intersected to form two vertical lines alo and blo which are discontinuous. The strip shaped branches in the domains C and D and the two vertical ends of the vertical main trunk 2 are intersected to form two vertical lines do and dlo which are discontinuous. The vertical lines alo and do and the vertical lines blo and dlo are respectively located at the two vertical ends of the vertical main trunk 2.

There are slits 9 and 10 in the vertical main trunk 2. The extending direction of the slits 9 and 10 is the same as the extending direction of the vertical main trunk. The slit 9 is located between the vertical line alo and the vertical line blo. The slit 10 is located between the vertical line do and the vertical line dlo.

Figure 9:
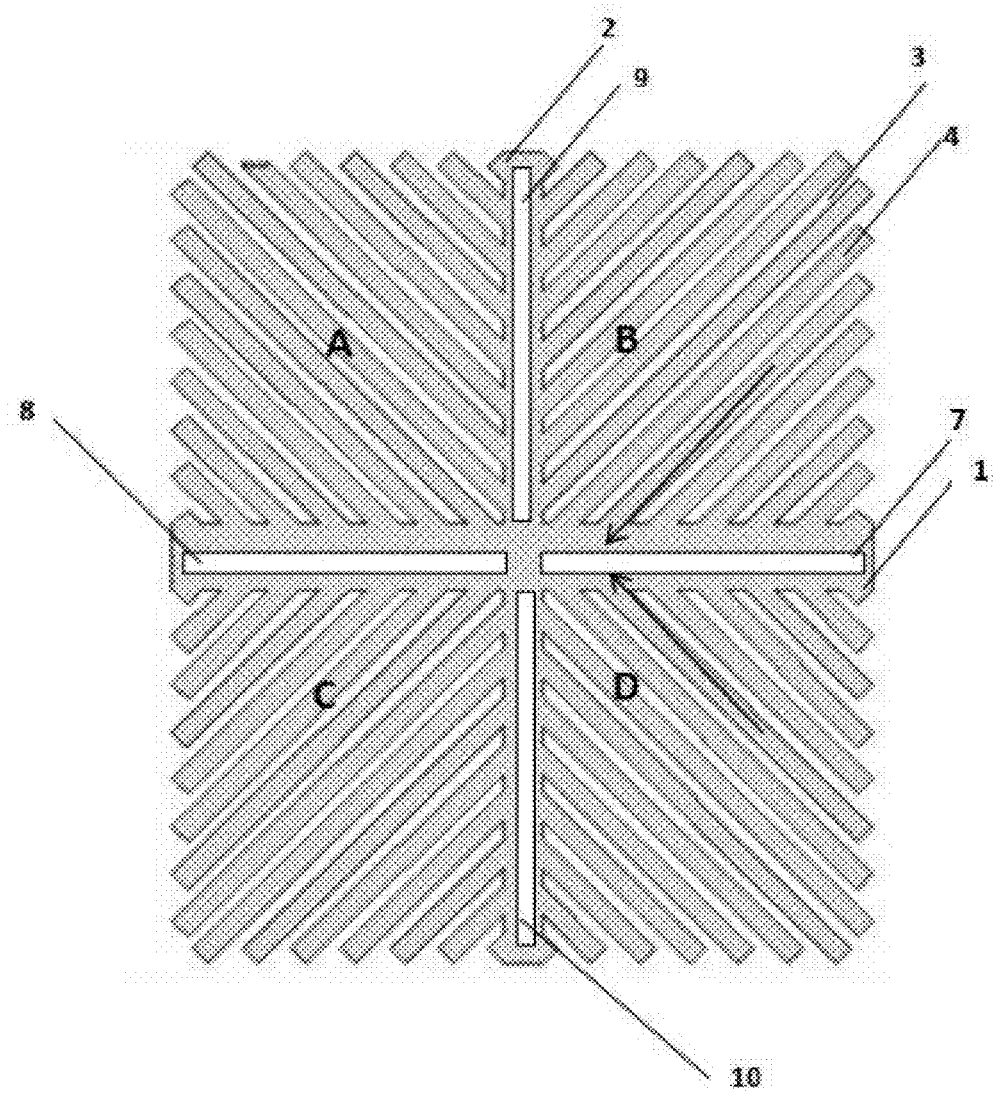
FIG. 9 is a schematic view of a structure of the tilt of liquid crystal molecules after a voltage is applied to the pixel electrode structure according to the second embodiment.

Please refer to FIG. 9, which is a schematic view of a structure of the tilt of liquid crystal molecules after a voltage is applied to the pixel electrode structure according to the second embodiment.

Liquid crystals are gradually tilted from the outside of the pixel electrode to the inside of the pixel electrode when a voltage is applied to the pixel electrode structure. The angle of the tilt is along the direction of the branches. The slit 7, the slit 8, the slit 9, and the slit 10 respectively separate every two of the strip shaped branches which are symmetrical with each other in relation to the vertical main trunk 2 and the horizontal main trunk 1 in the four domains, so that liquid crystals, where the strip shaped branches and the horizontal main trunk (or the vertical main trunk) are intersected, are tilted along the direction of the branches, rather than the mutual interference of the liquid crystals being tilted along two different directions containing the direction of the branches and a horizontal direction (or a vertical direction), thereby the liquid crystal molecules on the vertical main trunk and the horizontal main trunk are tilted in a particular direction, thus chaos cannot occur, and the dark fringes cannot be produced.

The embodiments of FIGS. 3 and 4 only show slits provided in two different types of the vertical main trunk and the horizontal main trunk. Understandably, for the case where slits are provided in other different types of the vertical main trunk and the horizontal main trunk, for example, there are three slits in the vertical main trunk and the horizontal main trunk, these are all included in the protection scope of the present invention, and are not described in more detail here.

Figure 5:
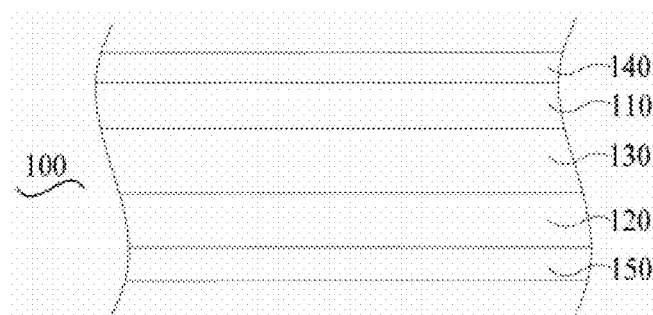
FIG. 5 is a partial profile view of an LCD panel according to one embodiment of the present invention.

FIG. 5 is a partial profile view of an LCD panel according to one embodiment of the present invention.

The liquid crystal panel 100 includes a first substrate 110, a second substrate 120, a liquid crystal layer 130, a first polarizing sheet 140, and a second polarizing sheet 150.

The liquid crystal layer 130 is formed between the first substrate 110 and the second substrate 120. That is, the liquid crystal layer 130 is placed at the inner sides of the first substrate 110 and the second substrate 120. The first polarizing sheet 140 is disposed at the outer side of the first substrate 110. The second polarizing sheet 150 is disposed at the outer side of the second substrate 120.

As shown in FIG. 5, the substrate material of the first substrate 110 and the second substrate 120 can be a glass substrate or a flexible plastic substrate. For example, the first substrate 110 can be a glass substrate (or a substrate made of other materials) having a color filter, and the second substrate 120 can be a glass substrate (or a substrate made of other materials) having a thin film transistor (TFT) array. Remarkably, the thin film transistor and the thin film transistor array can be disposed on the same substrate in some embodiments.

In the embodiment, the LCD panel 100 of FIG. 5 can be a PSVA mode LCD panel. Please refer to FIG. 6, which shows a partial profile view of the PSVA mode LCD panel according to an embodiment. At this point, the liquid crystal layer 130 includes a reactive monomer and a liquid crystal molecule. Preferably, the reactive monomer is a photosensitive monomer. The reactive monomer is mixed in the liquid crystal molecule. The first polarizing sheet 140 is disposed at one side of the first substrate 110, and opposite the liquid crystal layer 130 (known as a light-emitting side of the first substrate 110). The second polarizing sheet 150 is disposed at one side of the second substrate 120, and opposite the liquid crystal layer 130 (known as an incident light side of the second substrate 120).

Figure 6:
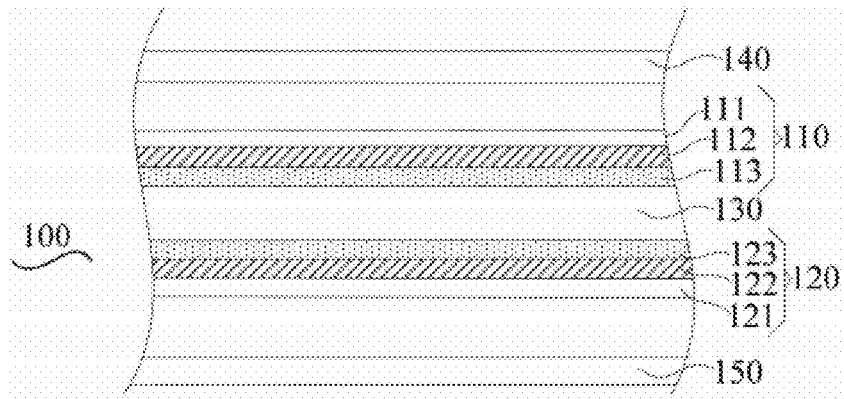
FIG. 6 is a partial profile view of a PSVA mode LCD panel according to an embodiment of the present invention.

As shown in FIG. 6, the LCD panel 100 is a PSVA mode LCD panel in the embodiment. The first substrate 110 includes a first electrode 111, a first alignment layer 112, a first polymeric alignment layer 113, and a first base (not shown in the figure). The first alignment layer 112 and the first polymeric alignment layer 113 are sequentially formed on the first electrode 111. The second substrate 120 includes a second electrode 121, a second alignment layer 122, a second polymeric alignment layer 123, and a second base (not shown in the figure). The second alignment layer 122 and the second polymeric alignment layer 123 are sequentially formed on the second electrode 121. Preferably, the first electrode 111 and the second electrode 121 are made of a transparent conductive material, such as ITO, IZO, AZO, GZO, TCO, or ZnO. A voltage can be applied to the liquid crystal molecule of the liquid crystal layer 130 by the first electrode 111 and the second electrode 121. In the embodiment, the first electrode 111 can be a common electrode, and the second electrode 121 can be a pixel electrode. Also, the second electrode 121 has a plurality of areas (not shown in the figure), and voltages applied to the areas can be the same or different. The first alignment layer 112 or the second alignment layer 122 and the first polymeric alignment layer 113 or the second polymeric alignment layer 123 have an alignment direction for deciding the alignment of the liquid crystal molecule of the liquid crystal layer 130. Also, the first alignment layer 112 or the second alignment layer 122 and the first polymeric alignment layer 113 or the second polymeric alignment layer 123 have a pre-tilt angle. The pre-tilt angle is less than 90 degrees, preferably less than 60 degrees. The first alignment layer 112 and the second alignment layer 122 are formed on the first substrate 110 and the second substrate 120, respectively. The first polymeric alignment layer 113 and the second polymeric alignment layer 123, which are polymerized by a reactive monomer, are formed on the first alignment layer 112 and the second alignment layer 122, respectively.

Figure 7:
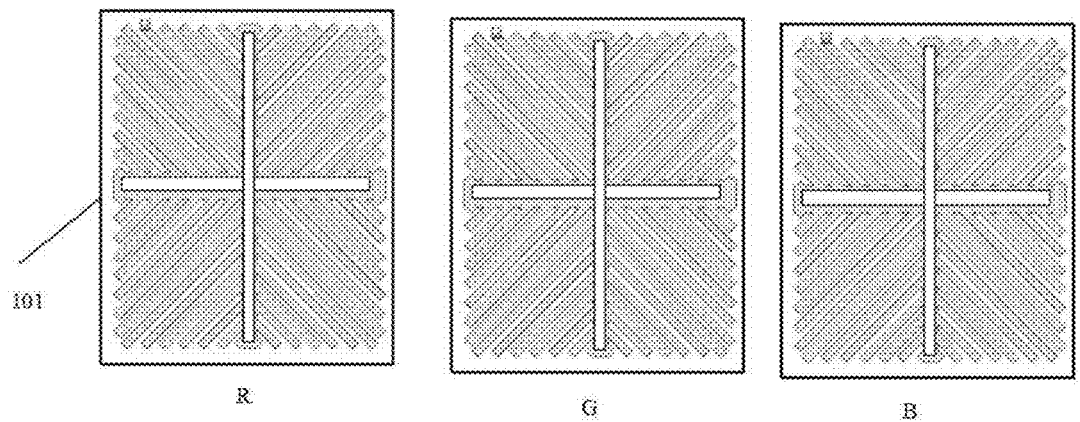
FIG. 7 is a schematic view of a structure of a pixel electrode in an LCD panel according to a preferred embodiment of the present invention.

Please also refer to FIG. 7, which shows a schematic view of a structure of a pixel electrode in an LCD panel according to a preferred embodiment of the present invention. The second substrate 120 includes a plurality of signal lines (not shown in the figure), such as gate lines and data lines, which are vertically crossed each other to show a matrix arrangement, thereby forming a plurality of pixel areas 101. Figures in FIG. 7 are pixel areas R, G, and B in that order. The pixel areas R, G, and B correspond to a red light, a green light, and a blue light, respectively. In each of the pixel areas 101, the second electrode 121 has a pixel electrode structure for forming a multi-domain alignment.

FIG. 7 is a schematic view of a structure of one of the pixel areas 101 of FIG. 6. The second electrode 121 in each of the pixel areas 101 includes: a strip shaped horizontal main trunk; a strip shaped vertical main trunk which is perpendicularly crossed the strip shaped horizontal main trunk, thereby each of the pixel areas 101 can be divided into four sub-pixel domains 102 by the vertical main trunk and the horizontal main trunk; and a plurality of strip shaped branches diverging outward from a crossed center between the vertical main trunk and the horizontal main trunk. There is a slit in the horizontal main trunk and the vertical main trunk, respectively.

The above are exemplary embodiments of the present disclosure. It should be noted that a number of improvements and modifications may be made by those of ordinary skill in the art without departing from the principles of the present disclosure, and should be considered as falling within the scope of the disclosure.

What is claimed is:

1. A pixel electrode structure, comprising:
a strip shaped horizontal main trunk;
a strip shaped vertical main trunk crossing the strip shaped horizontal main trunk; and
a plurality of strip shaped branches diverging outward from a crossed center between the vertical main trunk and the horizontal main trunk,
wherein there is at least one slit in the horizontal main trunk and the vertical main trunk, and
the horizontal main trunk and the vertical main trunk are vertically crossed,
wherein the slit located in the horizontal main trunk and the vertical main trunk is discontinuous, and
wherein an extending direction of the slit located in the horizontal main trunk is the same as an extending direction of the horizontal main trunk, and an extending direction of the slit located in the vertical main trunk is the same as an extending direction of the vertical main trunk.

2. The pixel electrode structure of claim 1, wherein the slit located in the horizontal main trunk and the vertical main trunk is contiguous.

3. The pixel electrode structure of claim 1, wherein every two of the strip shaped branches are symmetrical with each other in relation to the vertical main trunk and the horizontal main trunk, the symmetric strip shaped branches and the horizontal main trunk (or the vertical main trunk) have a intersecting line therebetween, respectively, and the slit is located between the two intersecting lines.

4. A pixel electrode structure, comprising:
a strip shaped horizontal main trunk;
a strip shaped vertical main trunk crossing the strip shaped horizontal main trunk; and
a plurality of strip shaped branches diverging outward from a crossed center between the vertical main trunk and the horizontal main trunk,
wherein there is at least one slit in the horizontal main trunk and the vertical main trunk,
wherein the slit located in the horizontal main trunk and the vertical main trunk is discontinuous, and
wherein an extending direction of the slit located in the horizontal main trunk is the same as an extending direction of the horizontal main trunk, and an extending direction of the slit located in the vertical main trunk is the same as an extending direction of the vertical main trunk.

5. The pixel electrode structure of claim 4, wherein the slit located in the horizontal main trunk and the vertical main trunk is contiguous.

6. The pixel electrode structure of claim 4, wherein every two of the strip shaped branches are symmetrical with each other in relation to the vertical main trunk and the horizontal main trunk, the symmetric strip shaped branches and the horizontal main trunk (or the vertical main trunk) have a intersecting line therebetween, respectively, and the slit is located between the two intersecting lines.

7. A liquid crystal display panel, comprising:
a first substrate comprising a first electrode;
a second substrate comprising a second electrode and a plurality of pixel areas, the second electrode having a pixel electrode structure in each of the pixel areas, the pixel electrode structure comprising: a strip shaped horizontal main trunk; a strip shaped vertical main trunk crossing the strip shaped horizontal main trunk; and a plurality of strip shaped branches diverging outward from a crossed center between the vertical main trunk and the horizontal main trunk, wherein there is at least one slit in the horizontal main trunk and the vertical main trunk; and
a liquid crystal layer formed between the first substrate and the second substrate,
wherein the slit located in the horizontal main trunk and the vertical main trunk is discontinuous, and
wherein an extending direction of the slit located in the horizontal main trunk is the same as an extending direction of the horizontal main trunk, and an extending direction of the slit located in the vertical main trunk is the same as an extending direction of the vertical main trunk.

8. The liquid crystal display panel of claim 7, wherein the slit located in the horizontal main trunk and the vertical main trunk is contiguous.

9. The liquid crystal display panel of claim 7, wherein every two of the strip shaped branches are symmetrical with each other in relation to the vertical main trunk and the horizontal main trunk, the symmetric strip shaped branches and both horizontal edges of the horizontal main trunk (or both vertical edges of the vertical main trunk) have a intersecting line therebetween, respectively, and the slit is located between the two intersecting lines.

* * * * *